United States Patent
Bosshart

Patent Number: 6,065,146
Date of Patent: May 16, 2000

[54] ERROR CORRECTING MEMORY

[75] Inventor: Patrick Bosshart, Plano, Tex.

[73] Assignee: Texas Instruments Incorporated, Dallas, Tex.

[21] Appl. No.: 08/955,145

[22] Filed: Oct. 21, 1997

[51] Int. Cl.$^7$ ........................ G11C 11/403; G11C 29/00
[52] U.S. Cl. ........................ 714/754; 365/222; 714/773
[58] Field of Search ........................ 714/754, 764, 714/773; 365/200, 222

[56] References Cited

U.S. PATENT DOCUMENTS

| | | | |
|---|---|---|---|
| 4,369,510 | 1/1983 | Johnson et al. | 371/13 |
| 4,380,812 | 4/1983 | Ziegler, II et al. | 371/37.3 |
| 4,506,362 | 3/1985 | Morley | 371/13 |
| 4,542,454 | 9/1985 | Brcich et al. | 711/106 |
| 4,694,454 | 9/1987 | Matsuura | 395/182.04 |
| 4,748,627 | 5/1988 | Ohsawa | 371/40.2 |
| 4,758,992 | 7/1988 | Taguchi | 365/222 |
| 4,766,573 | 8/1988 | Takemae | 365/222 |
| 5,012,472 | 4/1991 | Arimoto et al. | 714/765 |
| 5,127,014 | 6/1992 | Raynham | 365/200 |

*Primary Examiner*—Stephen M. Baker
*Attorney, Agent, or Firm*—Rebecca Mapstone Lake; Richard L. Donaldson

[57] ABSTRACT

An error-correcting dynamic memory (100) which performs error correction (110) only during refresh or during the second (or subsequent) read of a burst read or during a writeback. Further, the memory may contain an error-correction-code-obsolete bit in addition to data bits and check bits in order to generate check bits during refresh and not during write. This provides error correction without read access delay or write delay at the cost of slightly more exposure to soft errors.

4 Claims, 1 Drawing Sheet

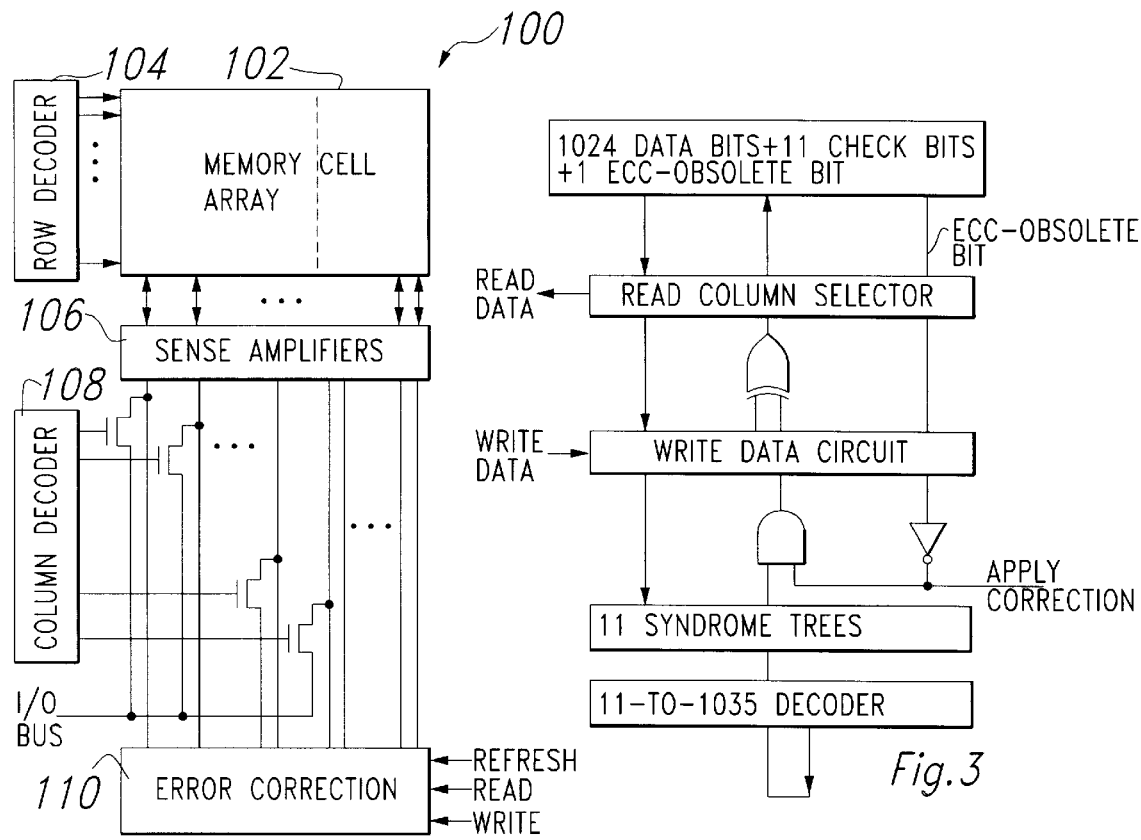
Fig. 1
Fig. 3
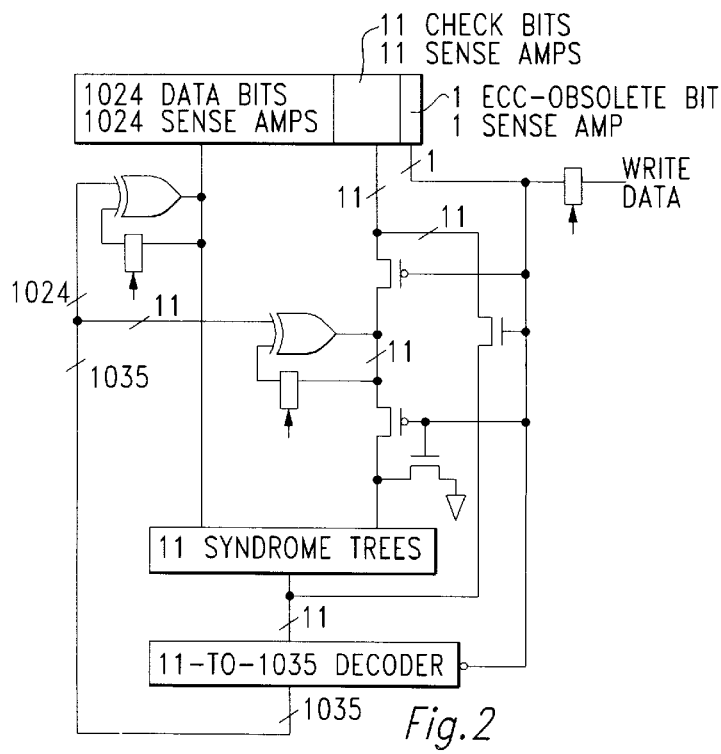
Fig. 2

ERROR CORRECTING MEMORY

BACKGROUND OF THE INVENTION

The invention relates to semiconductor devices and circuits, and, more particularly, to semiconductor memories with error correction.

Dynamic random access memories (DRAMs) typically store a bit as electric charge in a capacitor and access the capacitor through a field effect transistor. This exposes such a memory cell to soft errors from charge generated by subatomic particles penetrating the capacitor-side junction of the access transistor.

Various approaches to soft error correction have been attempted. For example, Furutani et al, A Built-In Hamming Code ECC Circuit for DRAM's, 24 IEEE JSSC 50 (1989) and Kalter et al, A 50-ns 16-Mb DRAM with a 10-ns Data Rate and On-Chip ECC, 25 IEEE JSSC 1118 (1990) describe DRAMs with additional error correction circuitry for error correction upon read operations and refresh operations (which is a read followed by a write back). This error correction compensates for soft errors but slows down the access time of the DRAM due to the error correction circuitry delay.

SUMMARY OF THE INVENTION

The present invention provides a DRAM with error correction circuitry which only operates during refresh and not during access operations.

This has the advantage of almost as complete soft error correction as with error correction during access operations but without any access delay.

BRIEF DESCRIPTION OF THE DRAWINGS

The drawings are schematic for clarity.

FIG. 1 illustrates in block format a preferred embodiment memory cell array and peripheral circuitry plus error correction circuitry.

FIGS. 2–3 show error correction circuitry.

DESCRIPTION OF THE PREFERRED EMBODIMENTS

Overview

FIG. 1 illustrates first preferred embodiment DRAM 100 as including memory cell array 102, row address decoder 104, sense amplifiers 106, column address decoder 108, and error correction circuitry 110. DRAM 100 has only a single memory cell array and single bit input/output for simplicity of explanation. The error correction circuitry may be as illustrated in FIGS. 2–3 which both implement a Hamming error correction code (ECC). (Peterson and Weldon, Error-Correcting Codes (MIT Press, 2d Ed, 1972) pages 117–119 provide a description of Hamming codes.) This is only one of many possible error correction circuits and one of many possible error correction codes. Indeed, DRAM 100 only corrects one error per row (the code block); whereas, other error correction codes could correct more errors per row. Each row in array 102 stores both data bits and the corresponding check bits plus an ECC-obsolete bit. For example, array 102 could have 1036 columns with the first 1024 columns storing data bits and the last 12 columns storing 11 check bits plus 1 ECC-obsolete bit. FIG. 1 illustrates check bit and ECC-obsolete bit columns at the righthand edge of array 102. The check bits and ECC-obsolete bit are not accessible through the input/output bus except for testing (not shown). Only the refresh operation implements the error correction. A write operation sets the ECC-obsolete bit. There is no error correction delay during a read or a write operation.

First preferred embodiment error correction

DRAM 100 operates as follows. A read of a data bit stored in array 102 follows the standard DRAM read: first decode the desired bit's row address by row decoder 104 which activates the cell access transistors along the entire corresponding row. Sense amplifiers 106 latch the row of bits, and then column decoder 108 puts the desired bit on the input/output bus by decoding the bit's column address and connecting this column's sense amplifier to the input/output bus. This is just a standard DRAM read operation and has no delay due to error correction.

A write of a data bit to array 102 also includes the standard row address decoding, sense amplifier latching, column address decoding, input/output bus (holding the new bit) connecting to the addressed column's sense amplifier to latch in the new bit, bitline isolating, and row deactivating. The write additionally puts a 1 in the ECC-obsolete memory cell of the row to indicate that a write into this row has taken place. FIG. 1 shows this setting of the ECC-obsolete bit as part of error correction circuitry 110. The ECC-obsolete bit being set will direct error correction circuitry 110 to generate check bits rather than perform error correction during the next refresh of the row. Error correction circuitry 110 also clears the ECC-obsolete bit when it determines and writes the new check bits during the next refresh.

A refresh operation likewise begins with a row address (from a refresh counter) applied to row decoder 104 to activate the access transistors in an entire row (data bits plus check bits plus ECC-obsolete bit), and sense amplifiers 106 latch the bits and feed the bits to error correction circuitry 110. If the ECC-obsolete bit is a 0, then error correction circuitry 110 performs any needed error correction and writes the (corrected) row of bits back into array 102; whereas, if the ECC-obsolete bit is a 1, then error correction circuitry 110 computes the check bits for the latched data bits and writes the data bits plus new check bits back into array 102 along with a 0 for the ECC-obsolete bit.

In particular, for the error correction case (ECC-obsolete bit 0), error correction circuitry 110 applies the 1024 data bits plus the 11 check bits of the row to 11 syndrome trees. If the resulting 11 syndrome bits (syndrome vector) are all 0, then no error correction is needed and the 1024 data bits and 11 check bits latched by sense amplifiers 106 are written back into the active row in array 102. Contrarily, if the syndrome vector is nonzero, then the syndrome vector applied to an 11-bit-to-1-of-1035 decoder picks out the column of the erroneous bit, and this bit is complemented (i.e., the corresponding sense amplifier is forced into the complementary state) prior to the bits being written back into the active row of array 102. See FIGS. 2–3.

The error-correcting refresh cycle thus consists of reading an entire row from array 102, passing the data bits and check bits of the row into the syndrome trees to identify an error (if at most one error exists), decoding the syndrome vector to locate the erroneous bit (if any), complementing the erroneous bit, and writing the row of (corrected) data and check bits back into array 102. This refresh cycle takes more time than a standard refresh cycle without error correction, but the error correction may only increase the standard refresh cycles's duration by a relatively small amount. Basically, the bit reading from the array and the writing to the array are relatively slow operations because sensitive sense amplifiers are slow. The error correcting circuitry is fast enough to add to a refresh cycle. Contrarily, the extra few ns consumed by error correction is an unacceptably large access delay for a memory read cycle.

In the check bit generation case (ECC-obsolete bit is 1), the syndrome trees generate 11 new check bits. In particular, the 1024 data bits from the recent write plus 11 0s in place of the 11 old check bits are the inputs to the syndrome trees, and the resulting 11 syndrome bits are taken as a new set of check bits. Then the data bits and new check bits are written back into array 102 along with a 0 for the ECC-obsolete bit.

Given that the DRAM contents are being periodically corrected through (typically externally initiated) refresh cycles, it is not as necessary to protect each data read against soft errors using error correction codes as it would be without refresh error correction. This assumes that the time window from the last refresh to the data read is a small fraction of the total time the data is present in the DRAM, so the probability of a soft error is correspondingly reduced. Similarly, the time window from a data write to the next refresh is also presumed to be a small fraction of the total time the data is present in the DRAM. Consequently, the preferred embodiment DRAMs output data read results without error correction; this eliminates the latency penalty of the error correction operation. Indeed, performing error correction only during refresh reduces the soft error rate by a few orders of magnitude, and this suffices to bring the overall DRAM soft error rate down to acceptable levels.

As a result of removing the error correction circuitry from the critical timing path of the data read access, the error correction circuitry can be designed to be somewhat slower. This reduction in the speed requirements may be used to decrease the area and/or power required for the error correction circuitry.

In short, the preferred embodiment scheme to eliminate the data read access time penalty is simple: just do not correct data read outputs, and continuously correct the DRAM contents during refresh operations. Similarly, the scheme eliminates a data write time penalty simply by setting the ECC-obsolete bit along with the new data bits write, and generating the check bits during the next refresh operation.

Write variations

Rather than the write operation consisting of a standard bit write together with a setting of the ECC-obsolete bit, the ECC-obsolete bit could be eliminated and the write operation include the generation of new check bits as follows: activate the row which is to hold the new data bit to be written, this latches the existing bits in the sense amplifiers; latch the new data bit in its column's sense amplifier; feed the row of thus updated data bits to the error correction circuitry to generate new check bits; and then write the updated data bits plus new check bits into the active row of memory cells in the array. This write cycle is longer than a standard write cycle, but the refresh operations will not need to generate check bits and will just correct errors.

Read variations

Burst read (read successive bits from the same row) and read with corrected write back alternatives to the basic scheme of the foregoing section exist, and the various read alternatives can be classified as follows:

(1) Single read with nothing further, error correction or check bit generation only during refresh.

(2) Single uncorrected read followed by error correction or check bit generation and write back of the corrected row in addition to the error correction during refresh.

(3) Burst read having the first bit read without error correction, but the row is error corrected or check bits generated and the second plus subsequent (error corrected) bits are then read. Additionally, refresh provides error correction or check bits generated.

Actually, in a burst read operation, only the first output need be unprotected: there is time to correct the subsequent outputs. Also, in a burst read, after the correction, there is time to write the corrected data back into the memory cells. For a single non-burst read operation, it may be desirable to output the data, then do the correction, following which the corrected data is put back into the memory array. This may incur a cycle time penalty for a single read, but it does not incur an access time penalty. Note that this means that if an unprotected soft error occurs, and the DRAM corrects the error after the data read, a simple retry of the memory access will produce a correct result. This means that systems which use parity to protect DRAM data but do not use error correction could simply retry the reference on a parity error, and would in this case get a correct result on the retry. This might make the difference between needing error correction or not for some systems.

Code block size

In general, m check bits implies $2^m$ possible syndrome vectors. The all zero syndrome vector is reserved for the no bit error case, and m of the syndrome vectors (vectors with components of ten 0s and one 1) are conveniently used for indicating check bit errors. Thus m check bits can support single error correction for $2^m$-1-m data bits. Thus for a row of 1024 data bits, 11 check bits (plus one ECC-obsolete bit) suffice.

A 4 Gbit DRAM divided into four quadrants of 1 Gbit each requires $2^{15}$ rows and columns in each quandrant. Typically, RC time constants of the wordlines (rows) and capacitve couplings of the bitlines (columns) demands subdivision of these quadrants to limit the number of columns in a row to approximately 1024 and segment the bitlines to limit the number of memory cells per sense amplifier to approximately 128 (although sense amplifiers can be shared by two bitline pairs). Each of the $2^{13}$ of such memory cell array blocks of 128 rows by 1024 columns and 1024 sense amplifiers could have its own error correction circuit with 11 syndrome trees; but this may consume too large a fraction of the total DRAM integrated circuit chip area. Consequently, multiple sense amplifiers (corresponding to collinear bitline segments) may be tied to the same error correction circuitry and reduce the number of error correction circuits. Indeed, typical refresh counters may count to 1024, 2048, or 4096, so 8, 16, or 32 sets of sense amplifiers could be tied to the same error correction circuitry. Alternatively, smaller error correction blocks could be used so that the 1024 data bits could be subdivided into 8 blocks of 128 data bits each. In this case each 128 bit block would have 9 check bits plus the 1 ECC-obsolete bit. Each of such groups of 138 bitlines would have its own error correction circuitry, although multiple sense amplifiers could again be tied together for error correction.

Other error correction codes might decrease the complexity of the syndrome trees at the expense of more check bits. For example, in a 1024 data bit block, a 2-dimensional parity check would store 1 parity bit for each row and 1 parity bit for each column for a total of 64 check bits for a 32 by 32 array containing the 1024 data bits. This exceeds the 11 check bits in the foregoing embodiment, but would reduce the number of exclusive OR gates in the syndrome trees.

Estimated effects

In the preferred embodiment DRAMs data is protected against soft errors much, but not all, of the time. The data is unprotected between the time its ECC block is written and the time it is next either refreshed or read, and between the time it is last refreshed and the time it is read.

The fraction of time DRAM bits are vulnerable to soft errors versus the time the bits are protected from them depends on the data access pattern of the DRAM. In computers with virtual memory, the number of page faults per second divided by the number of pages in DRAM gives a rough lifetime of a page in DRAM. On average, if a refresh interval is 100 ms and a page stays in DRAM for more than 100 seconds (a conservative estimate), then read-only data in DRAM (like program code) is only soft-error vulnerable 0.1% of the time due to the write.

Estimating the vulnerability of data in DRAM which is occasionally written is more difficult. In a computer system with 16 MB of DRAM, suppose 4 bytes can be written in 100 ns. It would take 0.4 second to write over the entire contents of memory. If the memory is busy 10% of the time, with 5% reading and 5% writing, then it would take 8 seconds to write the entire contents of memory. On average, each location would be read and written once during an 8 seconds interval. The read and the write would each have an average of 50 ms (half of a refresh cycle time) from or until the refresh, so the total unprotected time is 100 ms. This would mean any individual location is vulnerable to soft errors about 100 ms of an 8 seconds interval, or about 1.25% of the time.

While DRAM access patterns will determine the actual soft error susceptibility, it may only be necessary to gain 1–2 orders of magnitude of soft error immunity through this system, and it may be easy to establish that the memory access patterns actually accomplish this.

The worst access pattern which results in the highest percentage of soft-error vulnerable time is when the entire DRAM is swept through linearly, reading a word then writing over it. Suppose in a 16 Mbit×4 DRAM the cycle time is 50 ns, so a read and write can be done in 100 ns. It takes 16 M cycles to sweep through the entire DRAM, or 1.6 seconds. Presume a 100 ms refresh interval; the portion of the refresh interval prior to a read is vulnerable, and the portion of the refresh interval after the immediately succeeding write is also vulnerable due to the ECC-obsolete bit being set and the check bits not yet updated. Thus the total fraction of vulnerable time is 100 ms/1.6 sec which is about 6%.

If some locations are written and read more often, resulting in a higher perentage of soft-error vulnerable time, that necessarily means that other locations are read less often, making them less vulnerable. Because the full DRAM chip soft-error vulnerability is the sum of the susceptibilities of all its parts, the average soft-error vulnerability of the DRAM is improved. For example, if for a time 1% of the DRAM is continuously read and written in a pattern which makes it always soft-error susceptible, the other 99% of the DRAM chip is 100% soft-error protected.

Modifications and advantages

The preferred embodiments may be varied in many ways while retaining one or more of the features of data bit reads without error correction and data bit writes without error correction code check bits generation. For example, different error correction schemes could be implemented, including codes to correct two or more errors.

What is claimed is:

1. A method of error correction in a dynamic memory, comprising the steps of:

(a) setting an error-correction-code-obsolete bit during writing a data bit;

(b) generating check bits during refresh when said error-correction-code-obsolete bit is set.

2. A memory, comprising:

(a) memory cells arranged in rows and columns;

(b) each of said rows including data bit cells, check bit cells, and an error-correction-code-obsolete (ECC-obsolete) bit cell; and (c) error correction circuitry coupled to said memory cells, said error correction circuitry periodically considering a row of said cells and (i) when said ECC-obsolete bit cell is in a first state, correcting an error, if any, in bits contained in said data bit cells plus check bit cells of said row or (ii) when said ECC-obsolete bit cell is in a second state different from said first state generating replacement bits for said check bit cells from the bits in said data bit cells of said row.

3. The memory of claim 2, wherein:

(a) said memory is a dynamic random access memory; and (b) said periodically considering is during refresh.

4. The memory of claim 2, wherein:

(a) said error correction circuitry changes said ECC-obsolete bit cell from said second state to said first state along with said generating of (ii).

* * * * *

UNITED STATES PATENT AND TRADEMARK OFFICE
CERTIFICATE OF CORRECTION

PATENT NO.      : 6,065,146
DATED           : May 16, 2000
INVENTOR(S)     : Patrick Bosshart It is certified that error appears in the above-identified patent and that said Letters Patent is hereby corrected as shown below:

<u>Title page,</u>
Please insert the following after Related U.S. Applications Data:
Item -- [60] Provisional Application No. 60/028,975 filed October 21, 1996. --

Signed and Sealed this

Seventh Day of January, 2003

JAMES E. ROGAN
*Director of the United States Patent and Trademark Office*